(No Model.)
W. T. MERRILL & J. LAUGHTON.
SAW SWAGING DEVICE.
No. 393,256. Patented Nov. 20, 1888.
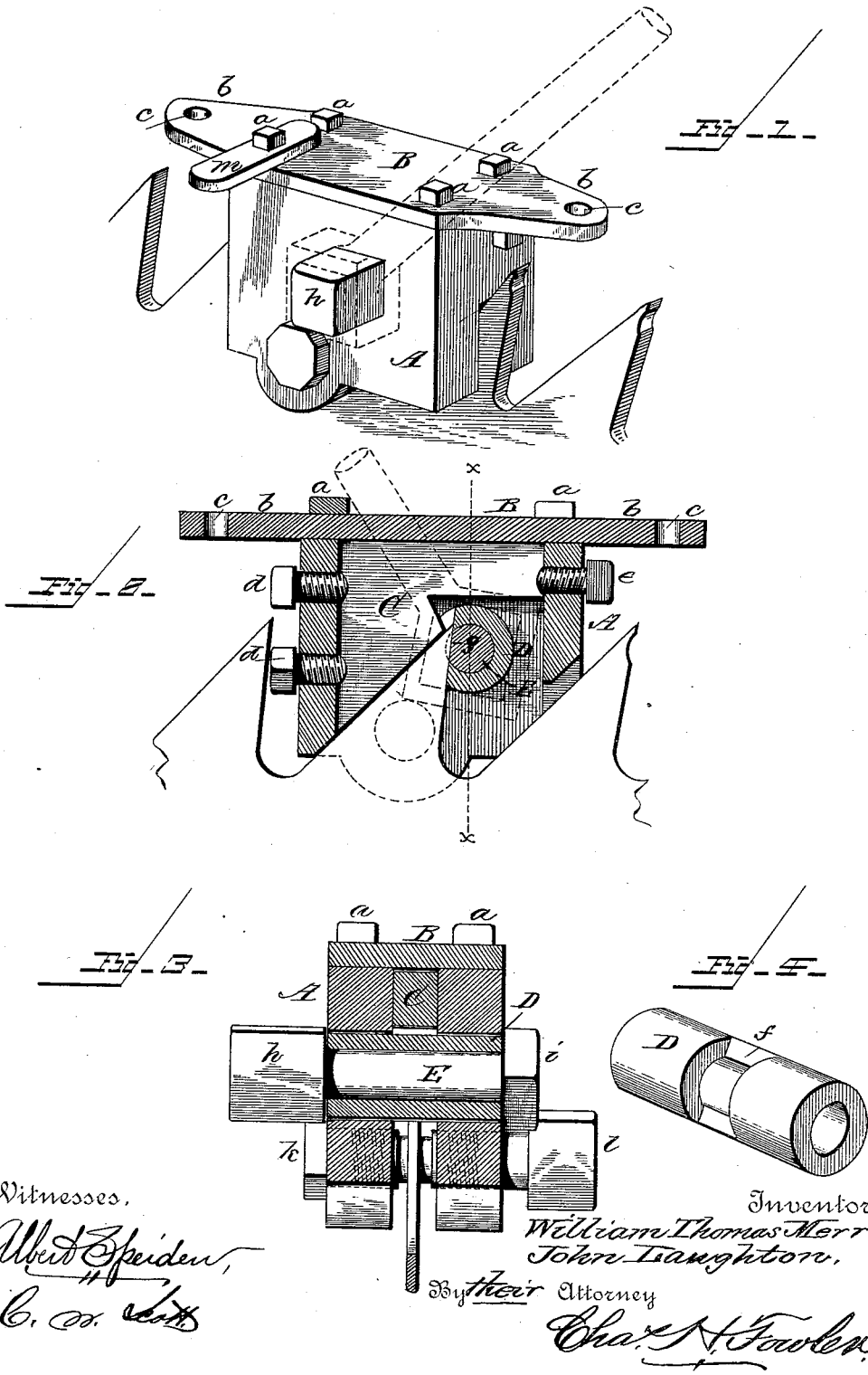

UNITED STATES PATENT OFFICE.

WILLIAM THOMAS MERRILL AND JOHN LAUGHTON, OF MILTON, FLORIDA.

SAW-SWAGING DEVICE.

SPECIFICATION forming part of Letters Patent No. 393,256, dated November 20, 1888.

Application filed May 29, 1888. Serial No. 275,485. (No model.)

*To all whom it may concern:*

Be it known that we, WILLIAM THOMAS MERRILL and JOHN LAUGHTON, citizens of the United States, residing at Milton, in the county of Santa Rosa and State of Florida, have invented certain new and useful Improvements in Saw-Swaging Machines; and we do hereby declare that the following is a full, clear, and exact description of the same, reference being had to the annexed drawings, making a part of this specification, and to the letters and figures of reference marked thereon.

Figure 1 of the drawings is a perspective view of our invention, showing the saw in position for swaging; Fig. 2, a longitudinal section thereof; Fig. 3, a transverse section taken on line *x x* of Fig. 2, and Fig. 4 a detail view in perspective of the tubular die-rest.

The present invention has for its object to provide a simple and practical device for swaging the teeth of saws; and it consists in the several details of construction, substantially as shown in the drawings, and hereinafter described and claimed.

In the accompanying drawings, A represents the block or frame of the swage, provided with a removable cap-plate, B, connected thereto by suitable screw-bolts, *a*, said plate having extensions *b* with holes *c*, for attaching the device to a bench or other object, if so desired. The block or frame is recessed longitudinally, and within this recess is located a back die, C, of the form shown in Fig. 2, which is held in its adjusted position by means of set-screws *d e*, the adjustability of the die enabling the device to fit any size or shape of tooth. A movable tubular rest, D, extends transversely through the block, and has its bearings in the sides thereof, and is formed with a recess, *f*, as shown in Fig. 4, and within this tubular rest is located the revolving swaging-die E, which has a flat face, as shown at *g*. This die has a square or irregularly-formed head, *h*, to which a suitable lever is connected, as shown in dotted lines, Figs. 1 and 2, and the opposite end of the die is screw-threaded to receive a nut, *i*, for connecting the die to the block or frame A. The saw-blade is held in position by means of clamping-screws *k l*, and a stop, *m*, limits the play of the lever when in the act of swaging the tooth.

In using the device the revolving die E is turned so as to bring the flat face *g* thereof in line with the recess *f* of the tubular rest D, so that said face will be exposed, this adjustment of the die being attained by means of the lever, (shown in dotted lines,) and to insure the die stopping at the proper point to bring the face thereof on line with the recess in the tubular rest the stop *m*, which is held in position on the cap-plate B by one of the bolts *a*, is adjusted so as to limit the movement of the lever, and is held in such adjusted position by the bolt before mentioned. The device is then placed on the saw-tooth, which will adjust itself thereto, and then by properly turning the set or clamping screw *l* the tooth is firmly clamped against the screw *k*. The revolving die E is now turned in a direction toward the operator by means of the lever hereinbefore described, when the saw-tooth will be perfectly swaged.

By means of the adjustability of the die C the tooth of the saw can be swaged at the extreme point as well as adapting the device to fit any-sized tooth. The revolving die E, as will be seen, is supported throughout its entire length, which not only gives it great strength and durability, but by using different tubular rests for the die with different depths of recesses the swaging may be so graduated as to make it applicable to any gage of saw desired.

Having now fully described our invention, what we claim as new, and desire to secure by Letters Patent, is—

1. In a saw-swage, the combination, with a suitable block or frame having an adjustable die, of a removable tubular die-rest, recessed as shown, and a revolving die located in said rest and supported throughout its entire length, substantially as and for the purpose set forth.

2. The combination, with the block A, of the removable tubular rest D, extended transversely through said block and having bearings in the sides thereof, and formed with recess $f$, the revolving die E within said rest, and formed with flat face $g$, and a lever secured to the extended squared end of said die, substantially as and for the purpose specified.

In testimony that we claim the above we have hereunto subscribed our names in the presence of two witnesses.

WILLIAM THOMAS MERRILL.
JOHN LAUGHTON.

Witnesses:
OTTO STUBER,
A. H. GREEN.